United States Patent Office 3,681,114
Patented Aug. 1, 1972

3,681,114
POLYPROPYLENE PLATING PROCESS
Ismat A. Abu-Isa, Birmingham, Mich., assignor to
General Motors Corporation, Detroit, Mich.
No Drawing. Filed Nov. 2, 1970, Ser. No. 86,291
Int. Cl. B44d 1/092; C23c 17/02
U.S. Cl. 117—47 A
3 Claims

ABSTRACT OF THE DISCLOSURE

A process for plating a polypropylene surface including the step of introducing into said surface an oxidation promoter from the group consisting of 1,3-diphenyl-2-propanone, 1,5-cyclooctadiene and bicyclo(2,2,1)-heptane-2-5 diene.

---

This invention relates to the metal plating of polypropylene compositions. In the beginning, injection molded polypropylene articles were difficult to metal plate uniformly. Commercial grades of polypropylene would not etch uniformly without a pre-etch treatment which involved soaking the polymer in an organic swelling agent, including turpentine or the like. More recently, plating grade polypropylene compositions have been developed and marketed which do not require organic pre-etch treatments but which are more costly than the commercial grades of polypropylene. These later compositions contain additives which promote uniform oxidation of the polypropylene composition which, in turn, enhances the ability of the polypropylene to accept a uniform electroless deposit of metal. As used herein, the term "polypropylene" is intended to include both the polypropylene homopolymers and its principal copolymers, e.g., the ethylene-propylene copolymers, as well as molding compositions containing art-known fillers such as talc, $TiO_2$ etc.

It is an object of this invention to provide a treatment for the surfaces of commercial grades of polypropylene to improve their oxidizability and to thereby produce a readily uniformly platable surface susceptible of receiving a strongly adherent metal coating. This and other objects of this invention will become more apparent from the detailed description which follows.

In accordance with this invention, a surface oxidation promoter selected from the group consisting of 1,3-diphenyl-2-propanone, 1,5-cyclooctadiene and bicyclo(2,2,1)-heptane-2-5 diene is absorbed into the surface to be plated and the surface subsequently oxidized in a concentrated aqueous solution of chromic acid. The oxidation promoters are introduced into the polypropylene surfaces by soaking the surfaces in appropriate baths of the promoters. A typical 1,3-diphenyl-2-propanone solution in accordance with this invention would contain about 0.3% to about 1.0% by weight in an organic solvent such as toluene, benzene, petroleum ether, and cyclohexanone or other solvents which will swell the polypropylene and which will themselves oxidize in the presence of concentrated chromic acid. A typical bath of the aforesaid dienes would contain a suspension of 5% to about 25% by weight diene in water containing a nonionic wetting agent such as Rohm & Haas' Triton X-100 or Minnesota Minning FC-95 anionic fluorochemical. No appreciable benefits are derived from 1,3-diphenyl-2-propanone bath concentrations in excess of about 10% by weight or diene bath concentrations in excess of about 25% since the higher concentrations merely consume excessive amounts of oxidant (i.e., $CrO_3$) during the surface oxidation/etching step and return no significant benefits over the use of a 0.3%-1.0% 1,3-diphenyl-2-propanone or 5%-25% diene concentration. The surfaces having the oxidation promoters therein are then oxidized in a concentrated chromic acid solution containing at least about 800 g./l. $CrO_3$. Some $H_3PO_4$ may be added to the chromic acid solution to improve wetting of the surface. I generally prefer about 5% $H_3PO_4$ but considerably more can be added without being detrimental to the polypropylene. The presence of the $H_3PO_4$ also extends the useful life of the $CrO_3$ bath. These oxidizing baths are preferably concentrated $CrO_3$ (i.e., 1000 g./l.) and used on the polymer for about 4–10 minutes at temperatures between about 75° C.–80° C. depending on polymer composition.

The oxidation promoters of this invention are absorbed into the surface of a polypropylene article which has first been formed (e.g., injection molded) from a commercial grade polypropylene (e.g., Hercules 6523). Other commercial grades tested include Hercules 6501, 6623, 6523, 7523 and 8523, PC 444 and a number of Avison samples. This is accomplished by soaking the article in a bath containing the appropriate promoter until the surface of the polypropylene swells and absorbs sufficient promoter to insure uniform etching/oxidation of the polypropylene. In the case of the aforesaid diene suspensions soaking usually requires at least about 5 minutes but rarely more than about 15 minutes when the bath temperature is about 40° C. In the case of toluene solvated 1,3-diphenyl-2-propanone soaking usually requires at least about 5 minutes but rarely more than about 15 minutes when the solution temperature is about 75° C. Obviously there are many time temperature concentration combinations which can be worked out by those skilled in the art and accordingly are not set forth in detail here.

When the concentration of the promoters in the treatment baths falls below the aforesaid 5% and 0.3% for the dienes and propanone respectively, no appreciable improvement in the oxidizability of the surface is detected within commercially acceptable treatment time limits of less than about 15 minutes. Uniform oxidation of the surface is required to obtain a uniform, strongly adherent electroless metal coating. Promoter concentrations in the treatment baths in excess of about 10% propanone and 25% dienes does not substantially improve the oxidizability of the surface over that obtained at the lower concentrations set forth above and in fact excess promoter absorbed into the polypropylene tends to nonusefully consume an excessive amount of oxidant ($CrO_3$) from the etching/oxidizing solution.

Polypropylenes promoter treated and oxidized in accordance with this invention are platable using otherwise conventional polymer treatment steps including sensitization with $SnCl_2$ activation with $PdCl_2$ and then metal deposition (e.g., Ni or Cu) from an electroless plating bath. Any desired electroplating sequence may follow the electroless deposition. Polypropylenes treated in accordance with this invention may also be plated using a process which is a variation of that generally described above and involves the use of a mixture of stannous chloride and colloidal palladium instead of the more conventional sensitizing solution. This step is followed by a palladium chloride accelerator treatment. Polypropylenes treated in accordance with this invention do not require a separate swelling treatment since the dienes, propanone and propanone solvents provide sufficient pre-etch swelling of the polypropylene.

A number of tests have been conducted in the following manner and the description thereof will serve as specific examples of this invention. ⅛ in. x 1 in. x 4 in. polypropylene flex bars were soaked in the oxidation promoting bath under the conditions set forth in the following paragraphs. They were next immersed in a 75° C. chromic acid etching solution containing 1000 grams per liter of $CrO_3$ and 5% by vol. $H_3PO_4$ for about 4–10 min. After rinsing, the pieces were treated for 3 minutes in a room temperature, aqueous stannous chloride solution containing about 35 grams per liter of $SnCl_2$, 30 milliliters per liter of HCl and a wetter to sensitize the surfaces. After rinsing, the pieces were next activated for 3 minutes, in a 75° F. aqueous, palladium chloride solution containing 0.26 gram per liter palladium chloride, 4.5 milliliters per liter HCl and a wetter. After rinsing, nickel was electrolessly deposited onto the surface for 6–10 minutes from an aqueous, 75° C. solution containing about 36 grams per liter nickel sulfate heptahydrate, 3.6 grams per liter sodium hydroxide, 28 grams per liter sodium hypophosphite, 13 cc. per liter acetic acid and 8 drops of lead concentrate (1 g./1 $Pb^{++}$). The pieces were rinsed and next electroplated with 2 mils of conventional acid copper (sulfate type) and then aged for 4–9 days. The samples were then adhesion tested according to the Jacquet test described in the article by E. B. Saubestre, J. Durney, G. Hajdow, E. Bastenbach, Plating, 52, 983, 1965. This test involves scribing a one (1) inch strip across and through the copper and nickel layers, lifting a tab at the end of the strip, grasping the tab in an Instron machine, pulling the strip at a rate of one (1) inch per minute at an angle of 90° from the face of the panel, and plotting the amount of pull (i.e., lbs./in.) required to peel the strip from the panel. The following are specific examples of tests conducted in accordance with the procedure set forth above.

(1) A Hercules 6623 polypropylene flex bar was soaked for 10 min. in a 75° C. both containing a 0.5% solution of 1,3-diphenyl-2-propanone toluene and oxidized for 8 min. in the $CrO_3$ solution. The sample exhibited a means adhesion value of 15.0 lbs./in.

(2) A Hercules 7523 polypropylene flex bar was soaked for 15 min. in a 60° C. both containing a 1% solution of 1,3-diphenyl-2-propanone in toluene and oxidized for 15 min. in the $CrO_3$ solution. The sample exhibited a mean adhesion value of 15 lbs./in.

(3) A Hercules 8523 polypropylene flex bar was soaked for 10 min. in a 75° C. bath containing a 0.5% solution of 1,3-diphenyl-2-propanone toluene and oxidized for 5 min. in the $CrO_3$ solution. The sample exhibited a mean adhesion value of 15 lbs./in.

(4) A Hercules 7523 polypropylene flex bar was soaked for 5 min. in a 75° C. bath containing a 20% suspension of cyclooctadiene in water and oxidized for 15 min. in the $CrO_3$ solution. The sample exhibited a mean adhesion value of 13 lbs./in.

A Hercules 7523 polypropylene flex bar was treated in the same manner as set forth in paragraph 4 above, subsequently nickel and chrome plated and subjected to thermal cycling tests. In this regard, and after the samples were rinsed and electroplated with 2 mils of conventional acid copper, a 0.7 mil layer of semibright nickel (Udylite N2E) was electrodeposited onto the acid copper layer. This was followed by a 0.4 mil layer of bright nickel (Udylite 66) and finally by a 0.01 mil layer of chrome. The thusly plated piece was aged for at least 72 hrs. and then subjected to thermal cycling in accordance with the following sequence which was repeated for four cycles—1 hr. at 185° F., 15 min. at 72° F., 1 hr. at −20° F., and 15 min. at 72° F. The thusly prepared and tested piece passed the thermal cycling test in that no blistering or other deterioration of the coating was observed at the completion of the test.

While this invention has been described in terms of specific embodiments thereof, it is not intended that it be limited thereto, except to the extent hereinafter set forth in the appended claims which follow.

I claim:

1. A process of metallizing a polypropylene surface comprising the steps of immersing said surface in a bath comprising at least one surface oxidation promoter selected from the group consisting of 1,3-diphenyl-2-propanone, 1,5-cyclooctadiene and bicyclo(2,2,1)-heptane-2-5 diene to introduce an oxidation promoter into said surface for initiating faster oxidation of said surface, immersing said surface in a strongly oxidizing concentrated aqueous solution consisting essentially of $CrO_3$ for a time sufficient to substantially uniformly oxidize said surface, depositing a catalytic metal on said oxidized surface to provide nucleation sites for subsequently applied electroless metal deposits, contacting said surface with a solution of a reducible compound of a coating metal and reducing said compound to electrolessly deposit a continuous layer of said coating metal on said catalyzed surface.

2. The process of metallizing a polypropylene surface comprising the steps of immersing said surface in a bath comprising an aqueous suspension containing about 5% to 25% of at least one surface oxidation promoter selected from the group consisting of 1,5-cyclooctadiene and bicyclo(2,2,1)-heptane-2,5 diene, immersing said surface in a concentrated, strongly oxidizing, aqueous solution consisting essentially of $CrO_3$ for a time sufficient to substantially uniformly oxidize said surface, depositing a catalytic metal on said oxidized surface to provide nucleation sites for subsequently applied electroless metal deposits, contacting said surface with a solution of a reducible compound of a coating metal and reducing said compound to electrolessly deposit a continuous layer of said coating metal on said catalyzed surface.

3. The process of metallizing a polypropylene surface comprising the steps of immersing said surface in a solution containing about 0.3% to about 1% 1,3-diphenyl-2-propanone in an oxidizable organic solvent which will swell polypropylene, immersing said surface in a concentrated, strongly oxidizing aqueous solution consisting essentially of $CrO_3$ for a time sufficient to substantially uniformly oxidize said surface, depositing a catalytic metal on said oxidized surface to provide uncleation sites for subsequently applied electroless metal deposits, contacting said surface with a solution of a reducible compound of a coating metal and reducing said compound to electrolessly deposit a continuous layer of said coating metal on said catalyzed surface.

References Cited
UNITED STATES PATENTS

| | | | |
|---|---|---|---|
| 3,556,955 | 1/1971 | Ancker et al. | 117—138.8 |
| 3,143,422 | 8/1964 | Caldwell | 117—138.8 |
| 3,489,590 | 1/1970 | Herwig | 117—47 |
| 3,567,487 | 3/1971 | Poppe et al. | 117—138.8 |

WILLIAM D. MARTIN, Primary Examiner

S. L. CHILDS, Assistant Examiner

U.S. Cl. X.R.

117—138.8 E, 160 R